US006282463B1

(12) United States Patent
Oneyama et al.

(10) Patent No.: US 6,282,463 B1
(45) Date of Patent: Aug. 28, 2001

(54) METHOD OF SELECTING PNEUMATIC DEVICES

(75) Inventors: Naotake Oneyama; Hidetsugu Fujitani; Kotaro Kurihara; Hu Ping Zhang; Mitsuru Senoo, all of Yawara-mura (JP)

(73) Assignee: SMC Corporation (JP)

( * ) Notice: Subject to any disclaimer, the term of this patent is extended or adjusted under 35 U.S.C. 154(b) by 0 days.

(21) Appl. No.: 09/452,064

(22) Filed: Nov. 30, 1999

(30) Foreign Application Priority Data

Dec. 16, 1998 (JP) ........................................ 10-375498

(51) Int. Cl.7 ........................ G05B 15/00; G05B 19/00

(52) U.S. Cl. ........................ 700/262; 700/3; 700/9; 700/17; 700/25; 700/83; 701/108; 116/55; 707/102; 707/103; 707/104; 172/2; 172/7; 172/9

(58) Field of Search ........................ 700/262, 3, 17, 700/9, 25, 83; 123/676, 677; 701/108; 116/55; 60/542; 707/102, 103, 104; 172/2, 7, 9; 228/47.1, 49.1, 49.3; 53/70

(56) References Cited

U.S. PATENT DOCUMENTS 4,479,570 * 10/1984 Kamio ........................ 210/103
5,429,009 * 7/1995 Wolfe et al. ........................ 73/865.8
5,748,500 * 5/1998 Quentin et al. ........................ 702/182
6,050,541 * 3/2000 Chatufale ........................ 251/63.3
6,101,419 * 8/2000 Kennedy et al. ........................ 700/3

FOREIGN PATENT DOCUMENTS 53-21320 7/1978 (JP) .
02000179503 * 6/2000 (JP) .

OTHER PUBLICATIONS

Varseveld et al., Accurate Position Control of a Pneumatic Actuator Using On/Off Solenoid Valves, 1997, IEEE, pp. 195–204.*

Mills, Hybrid Actuation of Robotic Manipulators: An Integral Manifold Control Approach, 1990, IEEE, pp. 817–823.*

Aziz et al., Automatic Tuning of an Accurate Position Controller for Pneumatic Actuators, 1998, IEEE, pp. 1782–1788.*

* cited by examiner

*Primary Examiner*—William A. Cuchlinski, Jr.
*Assistant Examiner*—McDieunel Marc
(74) *Attorney, Agent, or Firm*—Baker Botts L.L.P.

(57) ABSTRACT

A method of selecting pneumatic devices that satisfy specified load, speed and strength conditions to construct a pneumatic system. Data concerning pneumatic actuators, solenoid-controlled selector valves, drive controllers, pipes, pipe joints and exhaust treatment devices is stored in a pneumatic actuator database, a solenoid-controlled selector valve database, a drive controller database, a pipe database, a pipe joint database and an exhaust treatment device database, respectively, for each item number, and conditions required for pneumatic devices constituting a system are calculated. Then, pneumatic devices conforming to the calculated conditions are selected from the respective databases. At the first step, a pneumatic actuator satisfying a load condition, a strength condition and a speed condition is selected from the pneumatic actuator database on the basis of a calculation according to a basic equation. At the second step, a solenoid-controlled selector valve and an exhaust treatment device, each of which satisfies a discriminating formula concerning the speed condition, are selected from the respective databases. At the third step, a drive controller, a pipe and a pipe joint, each of which satisfies a discriminating formula concerning the speed condition, are selected from the respective databases.

5 Claims, 10 Drawing Sheets

FIG.3

(a) CIRCUIT CONFIGURATION

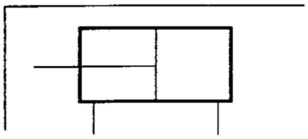

(a-1) CYLINDER(ACTUATOR)
GENERAL
DOUBLE ACTING
SINGLE ROD

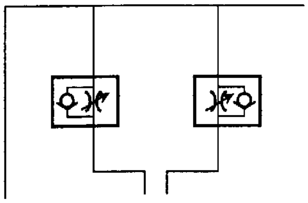

(a-2) SPEED CONTROLLER
METER-OUT
QUICK EXHAUST VALVE
NOT USED

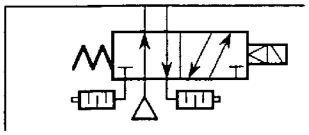

(a-3) SOLENOID-CONTROLLED SELECTOR VALVE
UNITIZED DIRECT INSTALLATION TYPE
TWO-POSITION SINGLE (b) REGARDING STROKE

| | | |
|---|---|---|
| STROKE | 200 ▼ | mm |
| ACTING DIRECTION | ⦿ PUSH (LEFT) ○ PULL (RIGHT) | |
| TOTAL STROKE TIME | 1 ▼ | s |
| SUPPLY PRESSURE | 0.5 ▼ | MPa |
| AMBIENT TEMPERATURE | 20 ▼ | ℃ |

(c) PIPING

| | | | | |
|---|---|---|---|---|
| OVERALL LENGTH | RIGHT | 2 ▼ | | m |
| | LEFT | 2 ▼ | | m |
| DRIVE CONTROLLER POSITION | RIGHT | CYLINDER DIRECT COUPLING ▼ | 0 ▼ | m |
| | LEFT | CYLINDER DIRECT COUPLING ▼ | 0 ▼ | m |

(d) LOAD

| | | | |
|---|---|---|---|
| MASS | 300 ▼ | | kg |
| REQUIRED THRUST | 0 ▼ | | N |
| MOUNTING ANGLE | 0 ▼ | | deg |
| USE APPLICATION, LOAD FACTOR | TRANSFER ▼ | 0.7 ▼ | |
| COEFFICIENT OF FRICTION | ROLLING ▼ | 0.1 ▼ | |

FIG.5

(a) FORMULA FOR SERIALLY COMBINING EFFECTIVE AREAS $$\frac{1}{S_0^m} = \sum_{i=1}^{n} \frac{1}{S_i^m} \quad \text{------------} \quad (1)$$

$m = 2 \sim 3$ $n = 3 \sim$ (b) FORMULA FOR ASSIGNING WEIGHT TO EACH DEVICE $$S_i = k_i S_2 \quad \text{------------} \quad (2)$$

$i = 3 \sim n$ (c) DISCRIMINATING FORMULAS $$S_2 \geqq f_2 (S_0, S_1, k_1 \cdots k_n) \quad \text{------------} \quad (3)$$

$$S_3 \geqq f_3 (S_0, S_1, S_2, k_i \cdots k_n) \quad \text{------------} \quad (4)$$

$$\vdots$$

$$S_n \geqq f_n (S_0, S_1 \cdots S_{n-1}, k_1 \cdots k_n) \quad \text{------------} \quad (5)$$

i = 1 ACTUATOR
i = 2 SOLENOID-CONTROLLED SELECTOR VALVE
i = 3 DRIVE CONTROLLER
i = 4 PIPE
i = 5 PIPE JOINT
i = 6 EXHAUST TREATMENT DEVICE

FIG.6

(a)

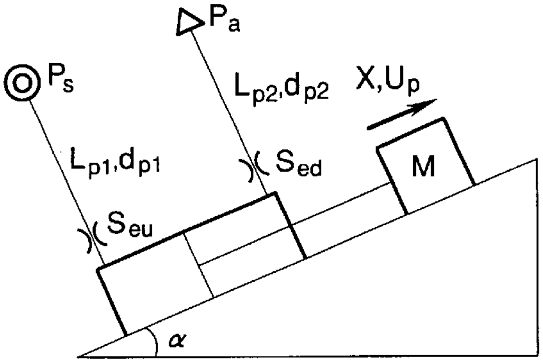

(b) <u>BASIC EQUATION OF RESTRICTOR</u>

<u>EQUATION OF FLOW RATE</u>

$$G = S_e P_h \sqrt{\frac{2\kappa}{R\theta(\kappa-1)}\left\{\left(\frac{P_l}{P_h}\right)^{\frac{2}{\kappa}} - \left(\frac{P_l}{P_h}\right)^{\frac{\kappa+1}{\kappa}}\right\}}$$

$P_l/P_h \geq 0.528$ (1a)

$$G = S_e P_h \sqrt{\frac{2\kappa}{R\theta}\left(\frac{2}{\kappa+1}\right)^{\frac{\kappa+1}{\kappa-1}}}$$

$P_l/P_h > 0.528$ (1b)

(c) <u>BASIC EQUATIONS OF AIR CYLINDER</u>

<u>EQUATIONS OF STATE</u>

$$PV = wR\theta \quad (2)$$

↓ DIFFERENTIATION

DISCHARGE CHAMBER $$\frac{dP_d}{dt} = \frac{1}{V_d}\left(\frac{P_d V_d}{\theta_d}\frac{d\theta_d}{dt} + R\theta_d G_d - P_d\frac{dV_d}{dt}\right) \quad (3)$$

CHARGING CHAMBER $$\frac{dP_u}{dt} = \frac{1}{V_u}\left(\frac{P_u V_u}{\theta_u}\frac{d\theta_u}{dt} + R\theta_u G_u - P_u\frac{dV_u}{dt}\right) \quad (4)$$

<u>EQUATIONS OF ENERGY</u>

$$\frac{t}{dt}(C_v w\theta) = Q + C_p G\theta_1 + P\frac{dV}{dt} \quad (5)$$

↓

DISCHARGE CHAMBER $$\frac{d\theta_d}{dt} = \frac{1}{C_v w_d}\left\{S_{hd}h_d(\theta_a - \theta_d) + RG_d\theta_d - P_d\frac{dV_d}{dt}\right\} \quad (6)$$

CHARGING CHAMBER $$\frac{d\theta_u}{dt} = \frac{1}{C_v w_u}\left\{S_{hu}h_u(\theta_a - \theta_u) + C_p G_u\theta_1 - C_v G_u\theta_u - P_u\frac{dV_u}{dt}\right\} \quad (7)$$

<u>EQUATION OF MOTION</u>

$$M\frac{du_p}{dt} = P_u S_u - P_d S_d + P_a(S_d - S_u) - Mg\sin\alpha - cu_p - F_q \quad (8)$$

FIG.7

(a)

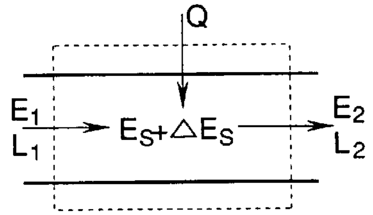

(b) BASIC EQUATIONS OF PIPE LINE

EQUATION OF CONTINUITY
$$\frac{\partial \rho}{\alpha t}+\rho\frac{\partial u}{\partial z}+u\frac{\partial \rho}{\partial z}=0 \quad (9)$$

EQUATION OF STATE
$$V\frac{dP}{dt}=R\theta\frac{dw}{dt}+wR\frac{d\theta}{dt} \quad (10)$$

EQUATION OF MOTION
$$\frac{\partial u}{\alpha t}+u\frac{\partial u}{\partial z}+\frac{1}{\rho}\frac{\partial \rho}{\partial z}+f=0 \quad (11)$$
$$f=\frac{\lambda}{2d_p}u|u|$$
$$\lambda=\frac{64}{Re} \qquad Re<2.5\times10^3$$
$$\lambda=0.3164Re^{-0.25} \qquad Re\geq2.5\times10^3$$

EQUATION OF ENERGY
$$\triangle E_s=E_1-E_2+L_1-L_2+Q \quad (12)$$

(c)

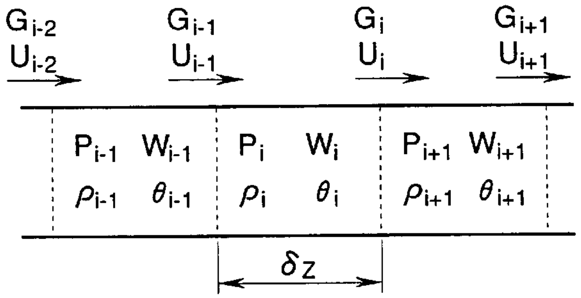

DISCRETE MODEL OF PIPE LINE (d) DISCRETIZATION OF BASIC EQUATIONS

EQUATION OF CONTINUITY
$$\frac{\partial w_i}{\alpha t}=G_{i-1}-G_i \quad (13)$$
$$G=pAu$$

EQUATION OF STATE
$$\frac{dP_i}{dt}=\frac{R\theta_i}{V}(G_{i-1}-G_i)+\frac{Rw_i}{V}\frac{d\theta_i}{dt} \quad (14)$$

EQUATION OF MOTION
$$\frac{\partial u}{\alpha t}=\frac{P_i-P_{i+1}}{\hat{\rho}\partial z}-\frac{\lambda}{2d}u_i|u_i|-|u_i|\frac{\partial u_i}{\partial z} \quad (15)$$
$$\hat{\rho}=\frac{\rho_i+\rho_{i+1}}{2} \qquad \frac{\partial u_i}{\partial z}=\frac{u_{i-1}-u_{i+1}}{2\partial z}$$

EQUATION OF ENERGY
$$\frac{d\theta_i}{dt}=\frac{1}{C_v w_i}\left\{E_1-E_2+L_1-L_2+Q-\frac{d}{dt}\left[\frac{1}{2}c_1 w_i\left(\frac{u_{i-1}+u_i}{2}\right)^2\right]\right\} \quad (16)$$

FIG.8

(a) INPUT CONDITIONS
(SIMILAR TO FIG.3(a) THROUGH FIG.3(d))

(b) RESULTS OF DEVICE SELECTION

| DEVICE | ITEM No. | PIPE JOINT |
|---|---|---|
| CYLINDER | MBL50-200□ | KQL08-02S |
| SOLENOID-CONTROLLED SELECTOR VALVE | SY7120-□□□□-02□ | KQL08-02S |
| MANIFOLD | | |
| SILENCER | AN200-02 | |
| DRIVE CONTROLLER | AS3200-03 | KQL08-03S |
| | AS3200-03 | KQL08-03S |
| PIPE | TO806□ | |

(c) VARIOUS CHARACTERISTIC VALUES

| | | |
|---|---|---|
| TOTAL STROKE TIME | 0.790 | s |
| STARTING TIME | 0.084 | s |
| AVERAGE SPEED | 253 | mm/s |
| MAXIMUM SPEED | 598 | mm/s |
| TERMINAL SPEED | 598 | mm/s |
| MAXIMUM ACCELERATION | 1.12 | m/s2 |
| MAXIMUM PRESSURE | 0.514 | MPa |
| AIR CONSUMPTION PER RECIPROCATING CYCLE | 4.96 | dm3(ANR) |
| REQUIRED AIR QUANTITY | 176.8 | dm3/mim(ANR) |

(d) DYNAMIC CHARACTERISTICS

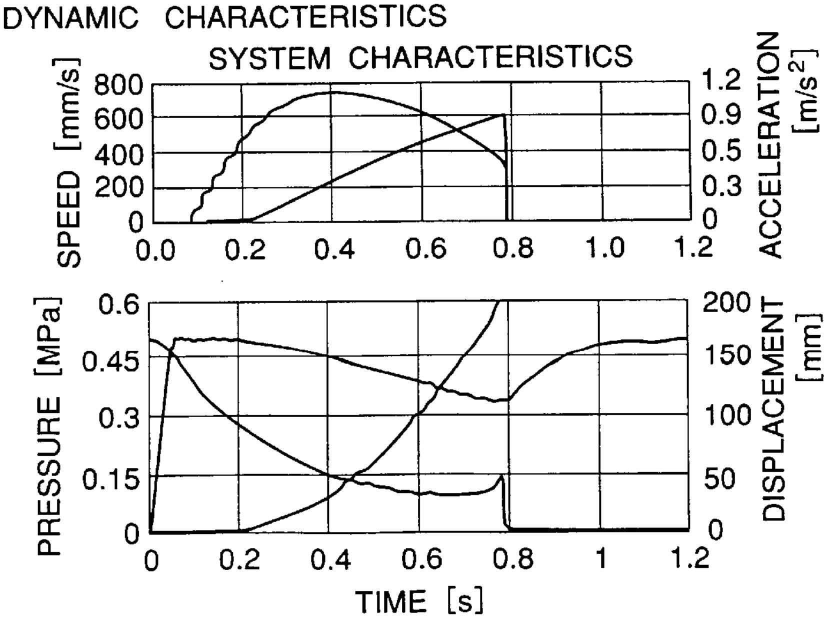

FIG.9

(a) INPUT CONDITIONS
(SIMILAR TO FIG.3(a) THROUGH FIG.3(d))

(b) DEVICES USED

| DEVICE | ITEM No. | PIPE JOINT |
|---|---|---|
| CYLINDER | MBL50-200□ | KQL08-02S |
| SOLENOID-CONTROLLED SELECTOR VALVE | SY7120-□□□□-02□ | KQL08-02S |
| MANIFOLD | | |
| SILENCER | AN200-02 | |
| DRIVE CONTROLLER | AS3200-03 | KQL08-03S |
| | AS3200-03 | KQL08-03S |
| PIPE | TO806□ | |

FIG.10

〔SYMBOLS〕

- $S$ : SECTIONAL AREA
- $C$ : COEFFICIENT OF VISCOUS FRICTION
- $C_v$ : CONSTANT-VOLUME RATIO
- $d$ : INNER DIAMETER OF PIPE LINE
- $F_q$ : MAXIMUM STATIC FRICTION
- $G$ : MASS RATE OF FLOW
- $h$ : HEAT TRANSFER RATE
- $M$ : LOAD MASS
- $P$ : PRESSURE
- $P_a$ : ATMOSPHERIC PRESSURE
- $P_s$ : SUPPLY PRESSURE
- $R$ : GAS CONSTANT
- $S_e$ : EFFECTIVE AREA OF RESTRICTOR
- $S_h$ : HEATING AREA
- $t$ : TIME
- $u$ : FLOW VELOCITY IN PIPE
- $V$ : VOLUME
- $w$ : AIR MASS
- $z$ : COORDINATES OF PIPE LINE
- $\theta$ : TEMPERATURE
- $\theta_a$ : ATMOSPHERIC TEMPERATURE
- $\kappa$ : RATIO OF SPECIFIC HEAT
- $\rho$ : AIR DENSITY
- $\triangle E_s$ : ENERGY NEWLY STORED IN SYSTEM
- $E_1, E_2$ : TOTAL ENERGY CARRIED IN AND OUT BY FLUID
- $L_1, L_2$ : WORK DONE BY FLUID IN AND OUT OF SYSTEM
- $Q$ : ENERGY FLOWING IN BY HEAT TRANSFER
- $L$ : LENGTH OF PIPING
  WORK DONE BY FLUID IN AND OUT OF SYSTEM
- $P_l$ : PRESSURE AT DOWNSTREAM SIDE OF RESTRICTOR
- $p_h$ : PRESSURE AT UPSTREAM SIDE OF RESTRICTOR
- $t_{req}$ : SPECIFIED RESPONSE TIME
- $S_o^m$ : DESIRED VALUE FOR TOTAL EFFECTIVE AREA

〔SUFFIXES〕

- $d$ : DISCHARGE SIDE
- $u$ : CHARGING SIDE
- $p$ : PIPE LINE

METHOD OF SELECTING PNEUMATIC DEVICES

BACKGROUND OF THE INVENTION

The present invention relates to a method of selecting a group of optimum pneumatic devices that satisfy conditions specified by a user to construct a pneumatic system.

To construct a user-specified pneumatic system (i.e. a terminal system including components provided between a selector valve and an air cylinder inclusive), a slide rule for designing a pneumatic system was devised [see Japanese Patent Application Post-Examination Publication No. 53-21320 (1978)]. The slide rule has a fixed piece and a sliding piece on each of the obverse and reverse sides thereof. The fixed and sliding pieces are marked with associated scales so as to satisfy an equation for calculating a stroke time of a double acting cylinder, an equation for calculating an output of the cylinder, an equation for calculating an air consumption in the cylinder and piping, and other equations. The slide rule enables various data necessary for system design to be calculated rapidly by jointly using a cursor operation. To select a group of optimum pneumatic devices, the conventional practice is to perform an approximative simple calculation with the above-described slide rule because it has heretofore been impossible to perform an accurate dynamic characteristic simulation. Therefore, the probability that the results of the device selection will meet the requirements is considerably low. Thus, it has heretofore been impossible to construct a desired system with a group of smallest devices and to realize a minimal energy consumption and a minimal cost.

At present, it is demanded to develop a method of rapidly selecting a group of optimum devices that satisfy user-specified conditions by using a calculating method of high accuracy and high reliability. In the device selection, it is necessary to satisfy the following conditions ① to ④:

① Load condition [the selected system should satisfy a mechanical condition necessary for the system to be capable of satisfactorily operating in compliance with input conditions for the specified operating unit (pneumatic actuator), e.g. load mass, thrust, use application, and supply air pressure].

② Speed condition [the selected system should operate so that an output member of the pneumatic actuator (e.g. a cylinder piston) can reach the stroke end within the specified total stroke time].

③ Strength condition [the selected system should satisfy the specified load condition and the pneumatic actuator should not be buckled, deformed or broken].

④ Connecting condition [the devices constituting the selected system should normally be connectable to each other].

SUMMARY OF THE INVENTION

A first object of the present invention is to provide a method of selecting pneumatic devices that satisfy specified load, speed and strength conditions to construct a pneumatic system.

A second object of the present invention is to provide a method of selecting pneumatic devices of the smallest sizes that satisfy a specified speed condition to construct a pneumatic system.

A third object of the present invention is to provide a method of confirming characteristics of a pneumatic system using devices selected appropriately.

The present invention provides a first method of selecting pneumatic devices, wherein data concerning pneumatic actuators, solenoid-controlled selector valves, drive controllers, pipes, pipe joints and exhaust treatment devices is stored in a pneumatic actuator database, a solenoid-controlled selector valve database, a drive controller database, a pipe database, a pipe joint database and an exhaust treatment device database, respectively, for each item number, and conditions required for pneumatic devices constituting a system are calculated, and then pneumatic devices conforming to the calculated conditions are selected from the respective databases. The first method includes the first step of selecting a pneumatic actuator satisfying a load condition, a strength condition and a speed condition from the pneumatic actuator database on the basis of a calculation according to a basic equation, and the second step of selecting a solenoid-controlled selector valve and an exhaust treatment device, each of which satisfies a discriminating formula concerning the speed condition, from the solenoid-controlled selector valve database and the exhaust treatment device database, respectively. The first method further includes the third step of selecting a drive controller, a pipe and a pipe joint, each of which satisfies a discriminating formula concerning the speed condition, from the drive controller database, the pipe database and the pipe joint database, respectively.

A second method of the present invention has the features of the first method and further includes the steps of calculating a desired value for the total effective area of all devices in a fluid passage necessary for a specified response time of the system, distributing the desired value to devices other than the pneumatic actuator by using a formula for serially combining effective areas, assigning weight coefficients to devices other than the pneumatic actuator, and incorporating the coefficients into the discriminating formulas used at the second and third steps.

A third method of the present invention has the features of the first and second methods and further includes the steps of constructing a pneumatic system using the pneumatic actuator, solenoid-controlled selector valve, drive controller, pipe, pipe joint and exhaust treatment device selected at the first, second and third steps, obtaining a response time t of the pneumatic system by a simulation, judging whether or not the response time t is shorter than the specified response time $t_{st}$, and changing the size of each of the solenoid-controlled selector valve, drive controller, pipe, pipe joint and exhaust treatment device according to the response time t such that when the response time t is shorter than the specified response time $t_{st}$, each of the solenoid-controlled selector valve, drive controller, pipe, pipe joint and exhaust treatment device is downsized, and then calculation of the response time t is repeated, whereas when the response time t is longer than the specified response time $t_{st}$, each of the solenoid-controlled selector valve, drive controller, pipe, pipe joint and exhaust treatment device is upsized, and then calculation of the response time t is repeated, thereby selecting a solenoid-controlled selector valve, drive controller, pipe, pipe joint and exhaust treatment device of the smallest sizes that satisfy the condition that the response time t is shorter than and closest to the specified response time $t_{st}$.

A fourth method of the present invention has the features of the first and second methods and further includes the steps of constructing a pneumatic system using the pneumatic actuator, solenoid-controlled selector valve, drive controller, pipe, pipe joint and exhaust treatment device selected at the first, second and third steps, and performing a numerical calculation on parameters of each device and service conditions by a simulation using basic equations of pneumatic actuator, solenoid-controlled selector valve, drive controller, pipe, pipe joint and exhaust treatment device as simultaneous equations, thereby obtaining dynamic characteristics and various characteristic values of the pneumatic system.

In addition, the present invention provides a fifth method including the steps of constructing a pneumatic system using a pneumatic actuator, a solenoid-controlled selector valve, a drive controller, a pipe, a pipe joint and an exhaust treatment device selected by an appropriate method, and performing a numerical calculation on parameters of each device and service conditions by a simulation, which is also used to select pneumatic devices, using basic equations of pneumatic actuator, solenoid-controlled selector valve, drive controller, pipe, pipe joint and exhaust treatment device as simultaneous equations, thereby obtaining dynamic characteristics and various characteristic values of the pneumatic system.

According to the first method, a pneumatic actuator satisfying the specified load, speed and service conditions for a pneumatic system is calculated according to a basic equation, and a solenoid-controlled selector valve, a drive controller, a pipe, a pipe joint and an exhaust treatment device that satisfy the speed condition are calculated. Then, pneumatic devices that conform to the results of the calculation are selected from the respective databases. Thus, devices that satisfy the specified load, speed and strength conditions are automatically selected. Moreover, the accuracy and reliability of the calculation results are favorably high.

According to the second method, a desired value for the total effective area of all restrictors in a fluid passage is calculated. The desired value is distributed to devices other than the pneumatic actuator by using a formula for serially combining effective areas, and weight coefficients are assigned to devices other than the pneumatic actuator. Therefore, a result that is close to the optimum value can be obtained by the first calculation. Accordingly, the time required to reach the final selection is shortened.

According to the third method, a judgment is made as to whether or not the response time t is shorter than the specified response time $t_{st}$. When the response time t is shorter than the specified response time $t_{st}$, each of the solenoid-controlled selector valve, drive controller, pipe, pipe joint and exhaust treatment device is downsized, and then calculation of the response time t is repeated, whereas when the response time t is longer than the specified response time $t_{st}$, each of the solenoid-controlled selector valve, drive controller, pipe, pipe joint and exhaust treatment device is upsized, and then calculation of the response time t is repeated, thereby selecting a solenoid-controlled selector valve, drive controller, pipe, pipe joint and exhaust treatment device of the smallest sizes that satisfy the condition that the response time t is shorter than and closest to the specified response time $t_{st}$. Accordingly, devices of the smallest sizes that satisfy the specified speed condition are selected.

According to the fourth method, a numerical calculation is performed on parameters of each device and service conditions by a simulation using basic equations of pneumatic actuator, solenoid-controlled selector valve, drive controller, pipe, pipe joint and exhaust treatment device as simultaneous equations, thereby obtaining dynamic characteristics and various characteristic values of the pneumatic system. Accordingly, the accuracy and reliability of the calculation results are favorably high, and a group of optimum devices that satisfy user-specified conditions can be selected rapidly.

The fifth method enables confirmation of characteristics of a pneumatic system using devices selected appropriately.

In the present invention, it is possible to update and add data to the cylinder database, the solenoid-controlled selector valve database, the drive controller database, the pipe database, the pipe joint database and the exhaust treatment device database in addition to the entry of service conditions. Therefore, the latest data can be used, and data concerning new models can be added.

BRIEF DESCRIPTION OF THE DRAWINGS

FIG. 3 is a diagram showing service conditions entered at step S2 in FIG. 2.

in FIG. 2.

FIG. 5 shows basic equations for selecting devices, e.g. a solenoid-controlled selector valve, a drive controller, a pipe, and a pipe joint.

FIG. 6 shows basic equations of restrictor and air cylinder used in a simulation at step S14 in FIG. 2.

FIG. 7 shows basic equations of pipe line used in the simulation at step S14 in FIG. 2.

FIG. 8 shows the way in which results of step S19 in FIG. 2 are displayed.

FIG. 9 shows "Enter item numbers of devices and service conditions" in the characteristic calculation flow in FIG. 1.

FIG. 10 shows notations of symbols and suffixes used in the basic equations in FIGS. 6 and 7.

DESCRIPTION OF THE PREFERRED EMBODIMENTS

FIGS. 1 to 10 show an embodiment of the pneumatic device selecting method according to the present invention. FIG. 1A is a diagram illustrating the general concept of the present invention. FIG. 1B is a circuit configuration diagram of an essential part of a pneumatic system to which the present invention is directed.

Figure 1A:
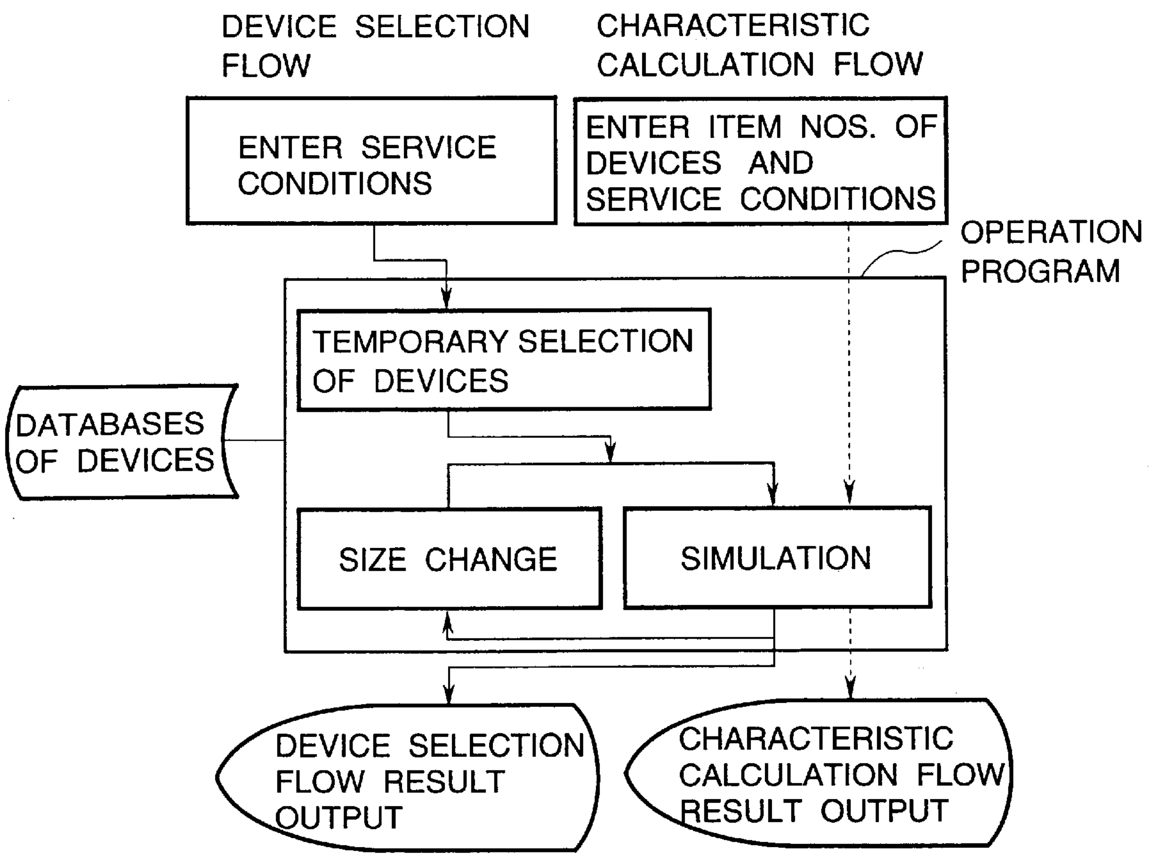
FIG. 1A is a diagram illustrating the general concept of the present invention.

As shown in FIG. 1A, the present invention has a device selection flow and a characteristic calculation flow and is capable of performing both device selection and characteristic calculation. An arithmetic operation program performs temporary selection of devices, simulation and size change by using information stored in databases of various devices. In the device selection flow, after service conditions have been entered, the arithmetic operation program performs temporary selection of devices, simulation, size change and simulation and outputs results of device selection, various characteristic values, and results of dynamic characteristic simulation and so forth.

In the characteristic calculation flow, the item numbers of appropriately selected devices and service conditions are entered, and a simulation is performed by the arithmetic operation program to output various characteristic values and results of dynamic characteristic simulation and so forth. In the device selection flow, devices are automatically selected, whereas in the characteristic calculation flow, a user selects devices appropriately (the user may change a part of automatically selected devices) and confirms characteristics of the selected device by the characteristic calculation flow. Thus, the user can construct a desired pneumatic system by repeating the characteristic calculation flow. It is also possible to examine the characteristics of an existing pneumatic system by the characteristic calculation flow and to change some devices if necessary.

Figure 1B:
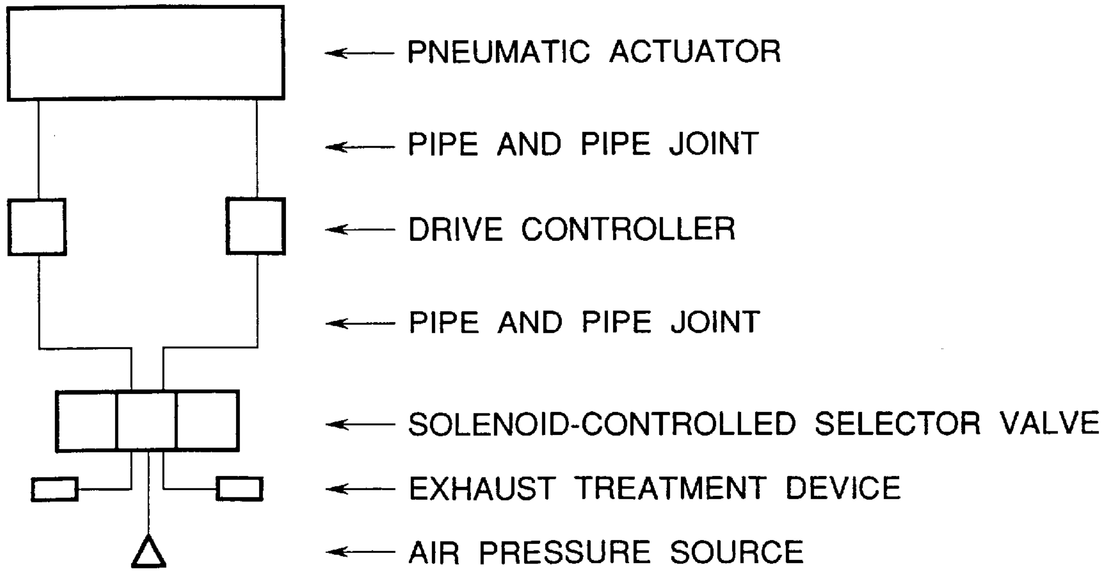
FIG. 1B is a circuit configuration diagram of an essential part of a pneumatic system to which the present invention is directed.

As shown schematically in FIG. 1B, devices which may be retrieved for selection by the method according to the present invention include hydraulic actuators (air cylinders, air motors, rodless cylinders, and rotary actuators), pipes (tubes), pipe joints, drive controllers [speed controllers (an arrangement in which a restrictor and a check valve are connected in parallel)], quick exhaust valves, solenoid-controlled selector valves (manifolds), exhaust treatment devices (silencers), and devices (pressure reducing valves) provided between an air pressure source and a solenoid-controlled selector valve. For device selection, data necessary for selection and calculation, i.e. data concerning the structure, function, performance, size, appearance (photograph), etc. of various devices such as those shown in FIG. 1B, has previously been stored in hardware of a computer (personal computer) system for each item number (model and series) of the various devices as a pneumatic actuator database, a solenoid-controlled selector valve database, a drive controller database, a pipe database, a pipe joint database, and an exhaust treatment device database.

Figure 2:
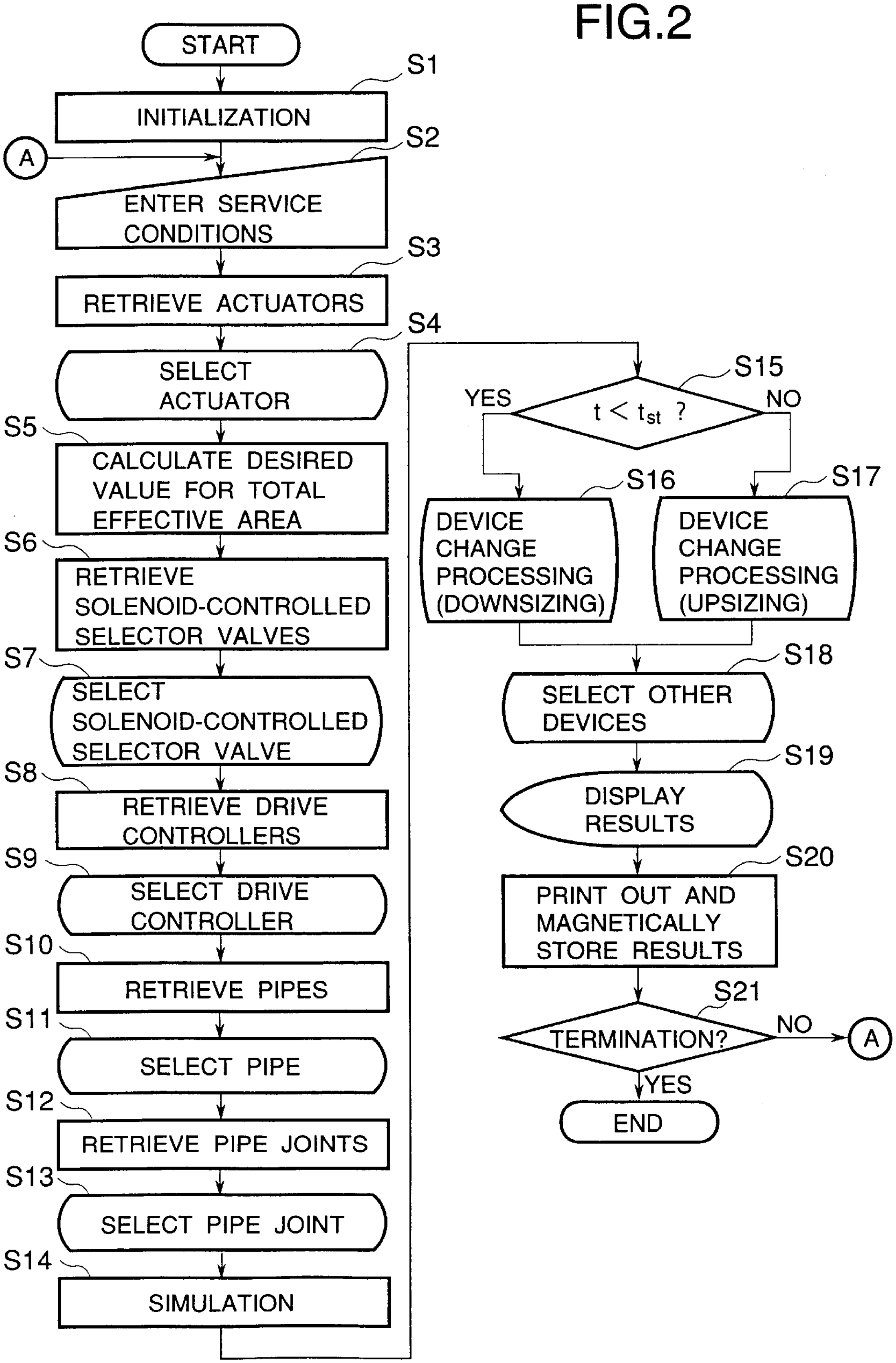
FIG. 2 is a flowchart showing a device selection flow in the present invention.
Figure 4A:
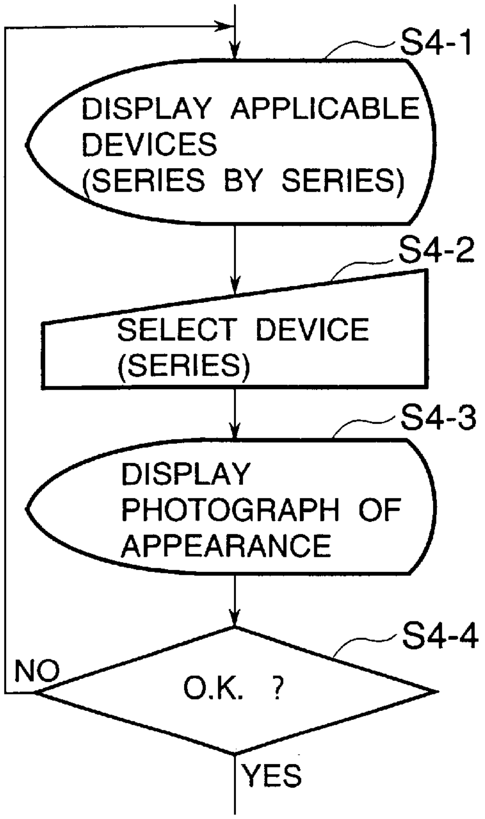
FIG. 4A is a flowchart showing a device selection flow at step S4, etc.
Figure 4B:
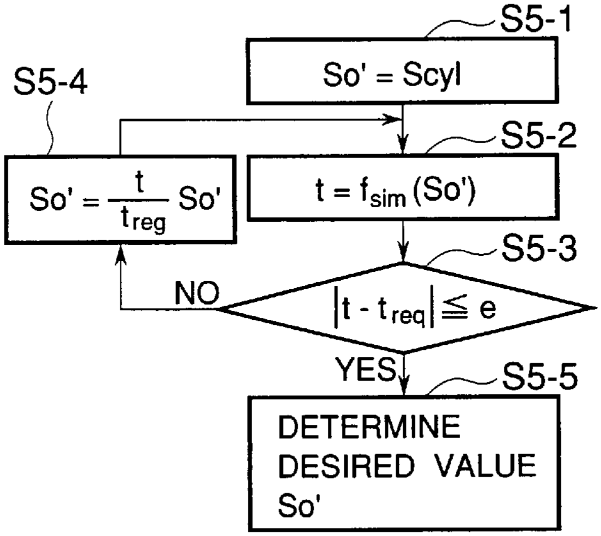
FIG. 4B is a flowchart showing a flow for obtaining a desired value for the total effective area.
Figure 4C:
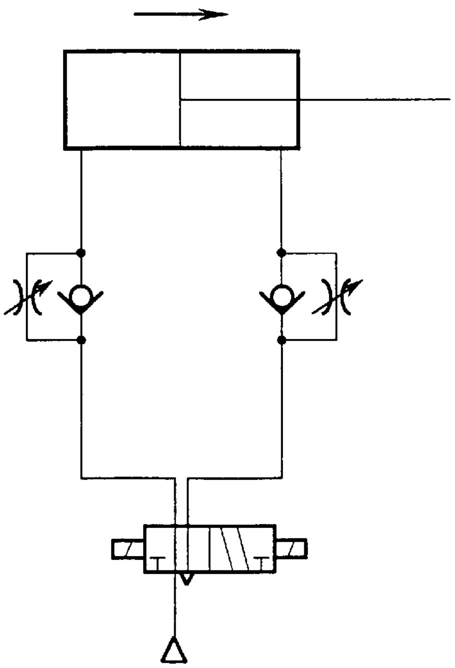
FIG. 4C is a diagram showing an example of the circuit configuration of a pneumatic system.
Figure 4D:
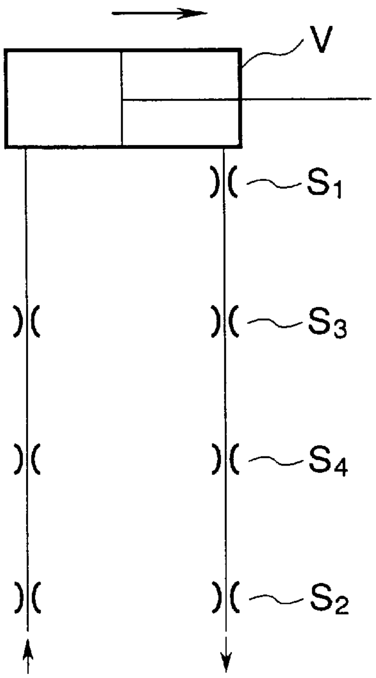
FIG. 4D is a diagram for describing the combining of effective areas.

FIG. 2 is a flowchart showing the device selection flow in the present invention. In the device selection flow, selection of devices is carried out in three stages. In the first stage, a pneumatic actuator is selected. In the second stage, a solenoid-controlled selector valve, a manifold, and an exhaust treatment device are selected. In the third stage, a drive controller, a pipe, and a pipe joint are selected. The reason why a pneumatic actuator is selected first is that a pneumatic actuator moves a load directly and can be selected according to the load condition, strength condition and speed condition [condition that the selected system should operate so that an output member of a pneumatic actuator (e.g. a cylinder piston) can reach the stroke end within the specified total stroke time] independently of other devices. After the selection of a pneumatic actuator, devices other than the pneumatic actuator are selected so that the system satisfies the speed condition.

The device selection method will be described below with reference to the flowchart of FIG. 2. When the program starts, initialization is executed at step S1 to carry out preparation and display of an input drawing, setting of variables, memory allocation, connection with the databases, etc. At step S2, the operator enters service conditions shown, for example, in FIG. 3 and those similar to them by using an input unit (personal computer), which is not shown. Part (a) of FIG. 3 shows a circuit configuration. An outline of the circuit configuration is as follows. Devices constituting a pneumatic circuit are divided into three groups: a group (a-1) of pneumatic actuators; a group (a-3) of solenoid-controlled selector valves and exhaust treatment devices; and a group (a-2) of drive controllers (speed controllers), pipes and pipe joints, which is located between the groups (a-1) and (a-3). Data items are entered for each device group. For example, if "cylinder", "general", "double acting" and "single rod" are entered in the section of the group (a-1) of pneumatic actuators, a skeleton diagram corresponding to the input data is displayed on the left side of the characters. If "rodless" is entered in place of "general", a skeleton diagram of a rodless cylinder is displayed.

If "speed controller", "meter-out", and "quick exhaust valve not used" are entered in the section of the group (a-2) of drive controllers (speed controllers), pipes and pipe joints, for example, a diagram showing meter-out type speed controllers provided in piping is displayed. If "unitized direct installation type" and "two-position single" are entered in the section of the group (a-3) of solenoid-controlled selector valves and exhaust treatment devices, for example, a skeleton diagram of a two-position solenoid-controlled selector valve and silencers, which are connected to piping, is displayed. Thus, drawings corresponding to entered items are displayed. Therefore, the incidence of errors in the input operation can be reduced.

In the section of "Regarding stroke" shown in part (b) of FIG. 3, items of data concerning stroke, acting direction, total stroke time, supply pressure, ambient temperature, etc. are entered. In the section of "Piping" shown in part (c) of FIG. 3, items of data concerning the overall length (right and left) of the pipe line connecting the cylinder and the solenoid-controlled selector valve, the drive controller position (right and left) (distance from the cylinder), etc. are entered. In the section of "Load" shown in part (d) of FIG. 3, items of data concerning mass, required thrust, mounting angle, use application, load factor, coefficient of friction, form of friction, type of guide, etc. are entered. When a size of load mass, a cylinder mounting angle, etc. are entered in the section of "load", a drawing corresponding to the entered items is displayed.

At step S3 in FIG. 2, pneumatic actuators (cylinders) are retrieved for selection. The retrieval of cylinders is executed by performing calculations based on programmed equations for calculating a cylinder bore, cylinder buckling and cylinder lateral load, together with the basic equations of cylinder, which are shown in part (c) of FIG. 6, thereby retrieving from the cylinder database cylinders of the smallest size that satisfy the following conditions 1̂ to 3̂: 1̂ load condition [the selected system should satisfy a mechanical condition necessary for the system to be capable of satisfactorily operating in compliance with input conditions for the specified pneumatic actuator (cylinder), e.g. load mass, thrust, use application, and supply air pressure]; 2̂ speed condition [the selected system should operate so that an output member of the pneumatic actuator (e.g. a cylinder piston) can reach the stroke end within the specified total stroke time]; and 3̂ strength condition [the selected system should satisfy the specified load condition and the pneumatic actuator should not be buckled, deformed or broken]. It should be noted that notations of various symbols in FIG. 6 and others are shown in FIG. 10.

At step S4, selection of a pneumatic actuator (cylinder) is made. The selection is carried out by interaction between the operator and the personal computer in accordance with a flow shown schematically in FIG. 4A. More specifically, at step S4-1, the series names of the cylinders retrieved at step S3 are displayed. At step S4-2, the operator selects a series name of cylinder considered to be optimum among the retrieved cylinders, and enters the result of the selection by operating the input unit. At step S4-3, a photograph of the appearance of the selected cylinder is displayed. If the operator judges the selected cylinder to be O.K., he or she selects YES at step S4-4. If the selected cylinder is judged to be no good, the operator selects NO at step S4-4, and the process returns to step S4-1.

Steps S6 to S13 (retrieval and selection of a solenoid-controlled selector valve, drive controller, pipe and pipe joint) are steps for temporary retrieval and temporary selection to determine initial values for steps S14 to S17 (optimum selection). To make the effective area of each device as close to an optimum value as possible and to reduce the number of calculations required for the optimum selection, at step S5 a desired value for the total effective area is calculated with respect to the cylinder as a single unit (the response time of the system is determined mainly by the effective areas of devices in the fluid passage of the cylinder), and the calculated desired value is distributed according to a predetermined rule to determine a size of each device. It should be noted that according to JIS (Japanese Industrial Standards) B0142 3220, "effective area of valve" is a computational cross-sectional area determined by converting the pressure drag to an equivalent orifice on the basis of the actual rate of flow through the valve and used as a value indicating the flow capacity of a pneumatic valve. The effective area may be said to be a concept equivalent to "sonic conductance" according to ISO 6358.

At step S5, the desired value So' for the total effective area is calculated. The desired value So' for the total effective area is a composite value [formula (1) shown in FIG. 5] of the effective areas of all restrictors in the fluid passage necessary for the response time of the system to become exactly equal to the specified response time. The method of calculating the desired value So' is shown in the flow (from step S5-1 to step S5-5) of FIG. 4B. At step S5-1, the effective area Scyl of the cylinder ports is entered as an initial value of the desired value So' for the total effective area. At step S5-2, a response time t is calculated by a simulation using the effective area of the cylinder ports as So'. At step S5-3, a judgment is made as to whether or not the response time calculated is within a deviation e of the specified response time. If YES is the answer at step S5-3, a desired value So' is determined at step S5-5. If it is judged at step S5-3 that the response time calculated is not within the deviation e, So' is set relatively small at step S5-4, and the process returns to step S5-2.

After the desired value So' for the total effective area has been determined at step S5, the desired value So' for the total effective area is distributed to devices other than the pneumatic actuator to determine sizes of these devices by using formula (1) for serially combining effective areas, which is shown in part (a) of FIG. 5. This will be described below with reference to FIGS. 4C and 4D by way of example. To appropriately distribute the desired value So' for the total effective area to each device, a weight is assigned to each device by using formula (2) shown in part (b) of FIG. 5.

At step S6, retrieval of solenoid-controlled selector valves is performed to retrieve from the solenoid-controlled selector valve database smallest solenoid-controlled selector valves whose effective areas $S_2$ satisfy the condition given by solenoid-controlled selector valve discriminating formula (3) shown in part (c) of FIG. 5. It should be noted that a manifold and an exhaust treatment device (silencer) are attached to each solenoid-controlled selector valve. Therefore, if it is necessary to retrieve manifolds and exhaust treatment devices for selection, solenoid-controlled selector valves are retrieved first, and then manifolds and exhaust treatment devices are retrieved. At step S7, selection of a solenoid-controlled selector valve is made. The step sequencing of the selection at step S7 is similar to that at step S4. First, the retrieved solenoid-controlled selector valves are displayed on a series-by-series basis. Then, a desired solenoid-controlled selector valve is selected, and a photograph of the appearance of the selected valve is displayed. Finally, a judgment is made as to whether or not the selected solenoid-controlled selector valve is O.K.

At step S8, retrieval of drive controllers is performed to retrieve from the drive controller database smallest drive controllers whose effective areas $S_3$ satisfy the condition given by drive controller discriminating formula (4) shown in part (c) of FIG. 5. At step S9, selection of a drive controller is made. The step sequencing of the selection at step S9 is similar to that at step S4. First, the retrieved drive controllers (speed controllers and quick exhaust valves) are displayed on a series-by-series basis. Then, a desired drive controller is selected, and a photograph of the appearance of the selected drive controller is displayed. Finally, a judgment is made as to whether or not the selected drive controller is O.K.

At step S10, retrieval of pipes is performed to retrieve from the pipe database smallest pipes whose effective areas $S_4$ satisfy the condition (i=4) given by pipe discriminating formula (5) shown in part (c) of FIG. 5. At step S11, selection of a pipe is made. The step sequencing of the selection is similar to that at step S4. First, the retrieved pipes are displayed on a series-by-series basis. Then, a desired pipe is selected, and a photograph of the appearance of the selected pipe is displayed. Finally, a judgment is made as to whether or not the selected pipe is O.K.

At step S12, retrieval of pipe joints is performed to retrieve from the pipe joint database smallest pipe joints whose effective areas $S_5$ satisfy the condition (i=5) given by pipe discriminating formula (5), shown in part (c) of FIG. 5, and which satisfy the connecting condition that the retrieved pipe joints should normally be connectable to devices and pipes which are to be connected by the pipe joints. At step S13, selection of a pipe joint is made. The step sequencing of the selection is similar to that at step S4. First, the retrieved pipe joints are displayed on a series-by-series basis. Then, a desired pipe joint is selected, and a photograph of the appearance of the selected pipe joint is displayed. Finally, a judgment is made as to whether or not the selected pipe joint is O.K.

The item numbers of the pneumatic actuator, solenoid-controlled selector valve, drive controller, pipe, pipe joint and exhaust treatment device selected by carrying out steps S3 to S13 are entered, together with the circuit configuration of FIG. 3 and service conditions shown exemplarily in FIG. 3 and those similar to them, to perform a simulation at step S14. In the simulation at step S14, a numerical calculation is performed by solving basic equations of cylinder (pneumatic actuator), solenoid-controlled selector valve, drive controller, pipe, pipe joint, etc., shown in FIGS. 6 and 7, as simultaneous equations. The simulation at step S14 provides the response time t and various other characteristics of the selected system, together with dynamic characteristics thereof.

Part (a) of FIG. 6 shows a physical model of a pneumatic system, and part (b) of FIG. 6 shows a basic equation of restrictor. The flow rate G of air passing through a restrictor is expressed by (1a) or (1b). Equations representing the flow rates of air passing through a solenoid-controlled selector valve, a drive controller, a pipe joint, etc, are obtained from equations (1a) and (1b).

Considering changes in temperature of air, equations shown in part (c) of FIG. 6 hold as basic equations of air cylinder: equations of state (2) to (4); equations of energy (5) to (7); and an equation of motion (8).

Part (a) of FIG. 7 shows a model of pipe line, and part (b) of FIG. 7 shows basic equations of pipe line (piping). The basic equations are expressed in the form of equation of continuity (9), equation of state (10), equation of motion (11), and equation of energy (12). If a pipe line is divided into n elements as shown in part (c) of FIG. 7 and the i-th element is considered, the basic equations are expressed in the form of equation of continuity (13), equation of state (14), equation of motion (15), and equation of energy (16). It should be noted that notations of the symbols and suffixes in the basic equations in FIGS. 6 and 7 are shown in FIG. 10.

At step S15, it is judged whether or not the response time t of the selected system is shorter than the specified response time $t_{sr}$. If YES, the process proceeds to step S16. If NO, the process proceeds to step S17.

If YES is the answer at step S15, it means that the overall size of the devices selected at least at steps S6 to S13 is larger than is needed. Therefore, the devices are downsized to a level closest to the specified response time. More specifically, at step S16: $\hat{1}$ the devices (solenoid-controlled selector valve, drive controller, pipe, pipe joint and exhaust treatment device) other than the pneumatic actuator are downsized in the order of decreasing size; $\hat{2}$ if the result of the downsizing is favorable, the downsizing of the devices is continued in the order of decreasing size; $\hat{3}$ when the size of a certain device has reached the lower limit, this device is excluded from the subjects of downsizing, while the downsizing of the remaining devices is continued, and when there is no device to be downsized, the results obtained so far are determined to be the final results; and $\hat{4}$ in a case where the judgment at step S15 becomes NO as the result of downsizing of a certain device, the device change processing is terminated, and the results obtained immediately before the downsizing of that device are determined to be the final results.

If NO is the answer at step S15, the overall size of the devices selected at least at steps S6 to S13 is excessively small. Therefore, the devices are upsized to a level closest to the specified response time. More specifically, at step S17: $\hat{1}$ the devices (solenoid-controlled selector valve, drive controller, pipe, pipe joint and exhaust treatment device) other than the pneumatic actuator are upsized in the order of increasing size; $\hat{2}$ if the result of upsizing a certain device is unfavorable, the upsized value is changed to the value of the device selected immediately before the upsizing, and this device is excluded from the subjects in the subsequent upsizing; $\hat{3}$ when the size of a certain device has reached the upper limit, because there is no larger device, the selection is stopped; $\hat{4}$ when the smallest of the effective areas of the solenoid-controlled selector valve, drive controller, pipe and pipe joint has become a predetermined number of times the effective area of the pneumatic actuator, the selection is stopped; and $\hat{5}$ in a case where the judgment at step S15 becomes YES as the result of upsizing of a certain device, the device change processing is terminated, and the results obtained at that time are determined to be the final results.

By the optimum selection at steps S14 to S17, a solenoid-controlled selector valve, drive controller, pipe, pipe joint and exhaust treatment device of the smallest sizes that provide the specified response time are selected on the assumption that a pneumatic actuator has already been selected.

Next, at step S18, selection of other devices is made (e.g. various pressure control valves provided between the solenoid-controlled selector valve and the pneumatic actuator, and piping and a pressure reducing valve that are provided between the solenoid-controlled selector valve and the air pressure source). If necessary, the selection at step S18 may be carried out in the same way as the selection at step S4. That is, the selection processing may be such that the retrieved devices are displayed, and a photograph of the appearance of a selected device is displayed, and finally a judgment is made as to whether or not the selected device is O.K.

At step S19, the selection results are displayed as shown, for example, in FIG. 8. The contents of the display are as follows. Input conditions similar to those in FIG. 3 are shown in part (a) of FIG. 8 (a detailed view thereof is omitted). In part (b) of FIG. 8, the item numbers of the selected devices are shown. In part (c) of FIG. 8, various characteristic values are shown (the condition of moisture condensation may be shown in this part). Dynamic characteristic curves and so forth are shown in part (d) of FIG. 8. At step S20, the selection results are printed out and magnetically stored.

At step S21, it is judged whether or not the process should be terminated. If NO, the process returns to step S2 through A. If YES is the answer at step S21, the process is ended.

As shown in FIG. 1A, the method according to the present invention makes it possible to perform a calculation to confirm characteristics of a pneumatic system. In the characteristic calculation flow, a circuit configuration, load condition and service conditions (stroke, piping and load) are entered, as shown in part (a) of FIG. 9, in addition to the item numbers of devices selected appropriately [for example, see part (b) of FIG. 9]. On the basis of the entered information, a simulation is performed according to the arithmetic operation program (the same as step S14 in FIG. 2) to output various characteristic values, dynamic characteristics, etc. The results of the simulation are displayed in the same way as in parts (a), (c) and (d) of FIG. 8.

What is claimed is:

1. A method of selecting pneumatic devices, wherein data concerning pneumatic actuators, solenoid-controlled selector valves, drive controllers, pipes, pipe joints and exhaust treatment devices is stored in a pneumatic actuator database, a solenoid-controlled selector valve database, a drive controller database, a pipe database, a pipe joint database and an exhaust treatment device database, respectively, for each item number, and conditions required for pneumatic devices constituting a system are calculated, and then pneumatic devices conforming to the calculated conditions are selected from the respective databases, said method comprising:

the first step of selecting a pneumatic actuator satisfying a load condition, a strength condition and a speed condition from the pneumatic actuator database on a basis of a calculation according to a basic equation;

the second step of selecting a solenoid-controlled selector valve and an exhaust treatment device, each of which satisfies a discriminating formula concerning the speed condition, from the solenoid-controlled selector valve database and the exhaust treatment device database, respectively; and the third step of selecting a drive controller, a pipe and a pipe joint, each of which satisfies a discriminating formula concerning the speed condition, from the drive controller database, the pipe database and the pipe joint database, respectively.

2. A method of selecting pneumatic devices according to claim 1, further comprising the steps of:

calculating a desired value for a total effective area of all devices in a fluid passage necessary for a specified response time of the system;

distributing said desired value to devices other than the pneumatic actuator by using a formula for serially combining effective areas;

assigning weight coefficients to devices other than the pneumatic actuator; and incorporating said coefficients into the discriminating formulas used at said second step and third step.

3. A method of selecting pneumatic devices according to claim 2, further comprising the steps of:

constructing a pneumatic system using the pneumatic actuator, solenoid-controlled selector valve, drive controller, pipe, pipe joint and exhaust treatment device selected at said first step, second step and third step;

obtaining a response time t of said pneumatic system by a simulation;

judging whether or not the response time t is shorter than the specified response time $t_{st}$; and changing a size of each of the solenoid-controlled selector valve, drive controller, pipe, pipe joint and exhaust treatment device according to the response time t such that when the response time t is shorter than the specified response time $t_{st}$, each of the solenoid-controlled selector valve, drive controller, pipe, pipe joint and exhaust treatment device is downsized, and then calculation of the response time t is repeated, whereas when the response time t is longer than the specified response time $t_{st}$, each of the solenoid-controlled selector valve, drive controller, pipe, pipe joint and exhaust treatment device is upsized, and then calculation of the response time t is repeated, thereby selecting a solenoid-controlled selector valve, drive controller, pipe, pipe joint and exhaust treatment device of smallest sizes that satisfy a condition that the response time t is shorter than and closest to the specified response time $t_{st}$.

4. A method of selecting pneumatic devices according to claim 2, further comprising the steps of:

constructing a pneumatic system using the pneumatic actuator, solenoid-controlled selector valve, drive controller, pipe, pipe joint and exhaust treatment device selected at said first step, second step and third step; and performing a numerical calculation on parameters of each device and service conditions by a simulation using basic equations of pneumatic actuator, solenoid-controlled selector valve, drive controller, pipe, pipe joint and exhaust treatment device as simultaneous equations, thereby obtaining dynamic characteristics and various characteristic values of said pneumatic system.

5. A characteristic calculating method comprising the steps of:

constructing a pneumatic system using a pneumatic actuator, a solenoid-controlled selector valve, a drive controller, a pipe, a pipe joint and an exhaust treatment device selected by an appropriate method; and performing a numerical calculation on parameters of each device and service conditions by a simulation, which is also used to select pneumatic devices, using basic equations of pneumatic actuator, solenoid-controlled selector valve, drive controller, pipe, pipe joint and exhaust treatment device as simultaneous equations, thereby obtaining dynamic characteristics and various characteristic values of said pneumatic system.

* * * * *